United States Patent [19]

Fuse

[11] Patent Number: 5,207,081
[45] Date of Patent: May 4, 1993

[54] VIBRATION DAMPER ASSEMBLY
[75] Inventor: Tomeo Fuse, Shizuoka, Japan
[73] Assignee: Kabushiki Kaisha Showa Seisakusho, Tokyo, Japan
[21] Appl. No.: 794,481
[22] Filed: Nov. 19, 1991
[30] Foreign Application Priority Data
  Nov. 19, 1990 [JP] Japan .............................. 2-121080[U]
[51] Int. Cl.$^5$ ............................................. D06F 37/22
[52] U.S. Cl. ............................................... 68/23.1
[58] Field of Search ............... 68/12.06, 12.14, 23.1, 68/23.3; 210/144; 34/43, 58; 74/574; 248/636, 638; 494/82; 188/129, 381

[56] References Cited
U.S. PATENT DOCUMENTS

| | | | |
|---|---|---|---|
| 3,226,016 | 12/1965 | Couper et al. | 68/23.3 X |
| 4,254,849 | 3/1981 | Pohlenz | 188/275 |
| 4,411,143 | 10/1983 | Scholl et al. | 68/13 R X |
| 5,080,204 | 1/1992 | Bauer et al. | 68/23.1 X |
| 5,085,064 | 2/1992 | Hayashi et al. | 68/12.06 X |

Primary Examiner—Philip R. Coe
Attorney, Agent, or Firm—Howard L. Rose

[57] ABSTRACT

A damper assembly is disposed between a washing machine frame and a washing container suspended in the frame and housing a rotatable drum as a source of vibration. The damper assembly includes a damper having a cylinder filled with working oil, a piston slidably disposed in the cylinder and having a damping force generating mechanism, and a piston rod having an end coupled to the piston and an opposite end extending out of the cylinder, a vibration transmission cutoff mechanism activatable for disabling the damping force generating mechanism to substantially cut off the transmission of vibration between the washing container and the frame, and a selective actuator for selectively activating and inactivating the vibration transmission cutoff mechanism depending on the magnitude of vibration of the washing container. The vibration transmission cutoff mechanism comprises a support structure for supporting the washing container or the frame and the cylinder or the piston rod for relative movement with respect to each other, and a locking mechanism for unlockably locking the members supported by the support structure. The selective actuator actuates the locking mechanism to unlock the members supported by the support structure from each other thereby activating the vibration transmission cutoff mechanism when the magnitude of vibration of the washing container is smaller than a predetermined value.

12 Claims, 3 Drawing Sheets

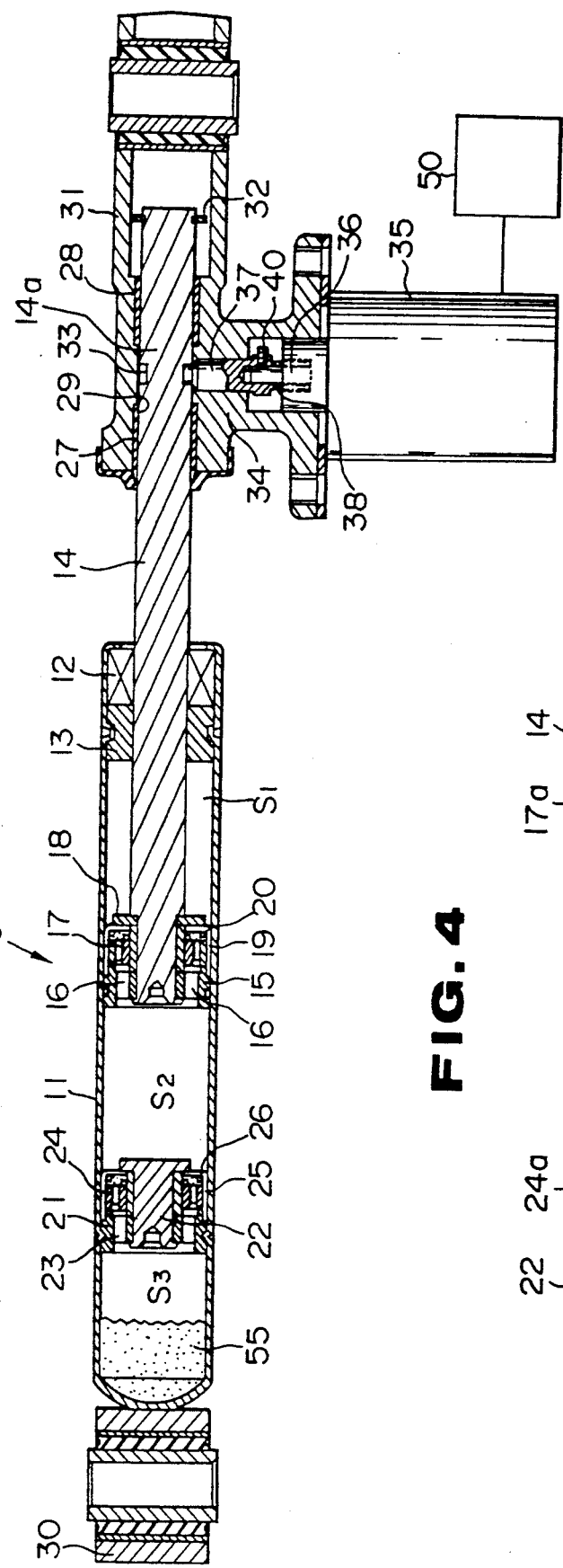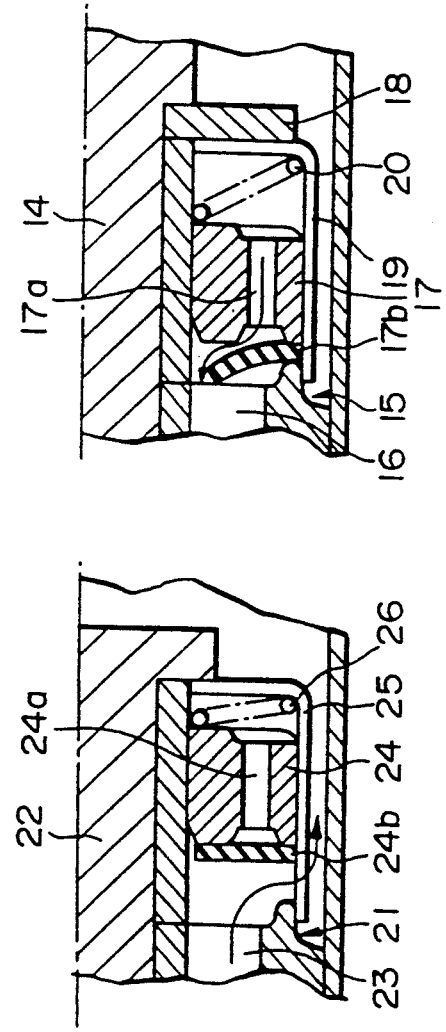

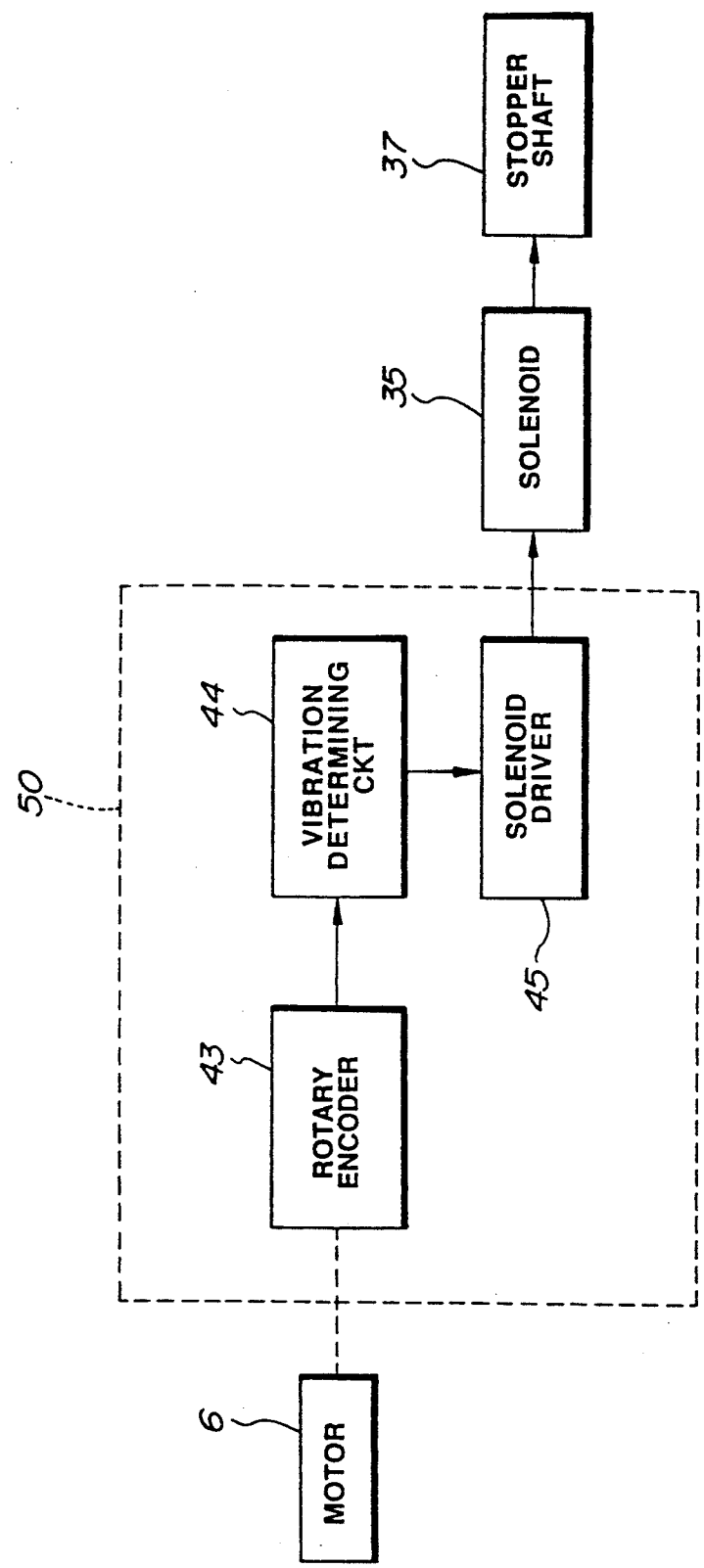

VIBRATION DAMPER ASSEMBLY

BACKGROUND OF THE INVENTION

1. Field of the Invention

The present invention relates to a vibration damper assembly for a washing machine or the like, and more particularly to a vibration damper assembly for use between a frame of a washing machine and the washing drum thereof suspended from the frame, for damping the vibration of the washing machine during operation thereof.

2. Description of the Relevant Art

Some washing machines have a washing drum that can also be used as a spinning drum for removing water from the washed wet material under centrifugal forces. To remove water from wet clothes or the like, they should be placed evenly within the spinning drum. If the wet material is not evenly distributed in the spinning drum, i.e., if it is displaced off the center of rotation of the spinning drum, then the wet material is subjected to large centrifugal forces because it contains much water and heavy, vibrating the spinning drum radially.

The user of such a washing machine is therefore required to be careful enough to place the washed wet material evenly centrally in the spinning drum.

There are known washing machines with washing drums that are rotatable about a horizontal axis. Wet clothes placed in such washing drums are necessarily displaced off the center of rotation of the washing drums. U.S. Pat. Nos. 4,254,849 and 4,411,143, for example, disclose washing machines with hydraulic dampers for damping vibration of washing drums that are rotatable about the horizontal axis.

However, when the washing drums rotate at a normal high speed, more vibration is transmitted to the washing machine frame through the hydraulic dampers, producing more noise because of vibratory movement with respect to the floor or other stationary base, than would be if no hydraulic dampers were employed.

SUMMARY OF THE INVENTION

According to the present invention, there is provided a damper assembly for use between a frame and a container suspended in the frame and housing a rotatable drum as a source of vibration, said damper assembly comprising a cylinder adapted to be supported by either one of the frame and the container, said cylinder being filled with working oil, a piston slidably disposed in said cylinder, damping force generating means on said piston, for generating damping forces against vibration transmitted from the container, a piston rod having an end coupled to said piston and an opposite end extending out of said cylinder and supported by the other of the frame and the container, vibration transmission cutoff means activatable for disabling said damping force generating means to substantially cut off the transmission of vibration between the container and the frame, detecting means for detecting the magnitude of the vibration of the container, and selective actuator means connected to said detecting means, for selectively activating and inactivating said vibration transmission cutoff means depending on the detected magnitude of the vibration of the container.

Until the rotatable drum rotates at a normal high speed, the frame and the container are connected to each other by a damper composed of the cylinder, the piston, and the piston rod. Therefore, the damping force generating means is activated to produce damping forces to absorb the vibration from the container. When and after the rotational speed of the drum reaches the normal high speed, the frame and the container are disconnected from each other thus cutting off the transmission of the vibration between the frame and the container.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 2 is an enlarged longitudinal cross-sectional view of each of the vibration damper assemblies shown in FIG. 1;

FIG. 4 is an enlarged fragmentary cross-sectional view of a damping force generating device in the piston and cylinder assembly of the vibration damper assembly shown in FIG. 2; and FIG. 5 is a block diagram of a control unit for controlling a solenoid for locking and unlocking the piston rod of the piston and cylinder assembly.

DETAILED DESCRIPTION OF THE PREFERRED EMBODIMENT

Figure 1:
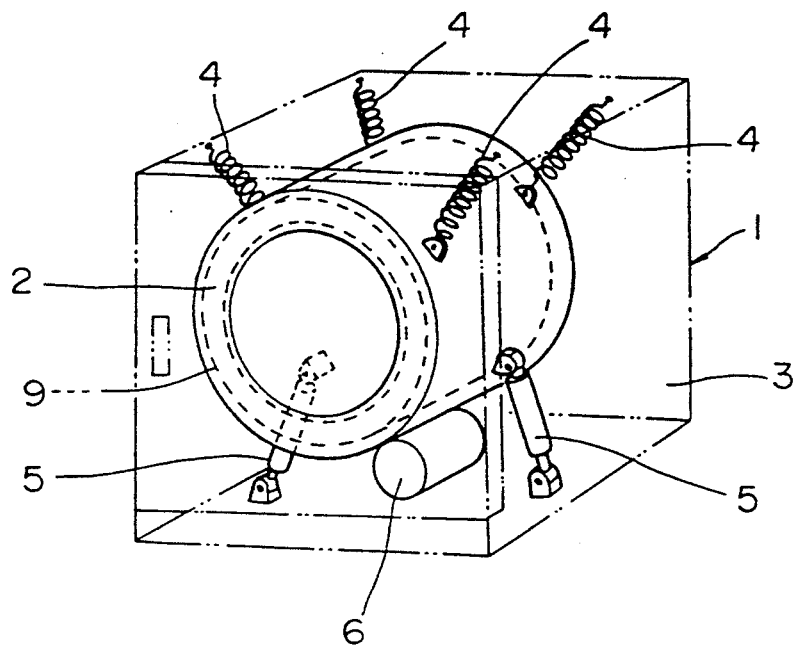
FIG. 1 is a schematic perspective view of a washing machine incorporating vibration damper assemblies according to the present invention.

As shown in FIG. 1, a washing machine 1 has a cylindrical washing container 2 that is suspended by four upper coil springs 4 coupled between the washing container 2 and an upper panel of a box-shaped frame 3. The washing container 2 is connected to a lower panel of the frame 3 by a plurality of (two in the illustrated embodiment) vibration damper assemblies 5. The washing container 2 houses therein a cylindrical rotatable drum 9 that is rotatable about its horizontal axis at a lower speed by a motor (not shown) for washing clothes or the like in the drum 9 and also at a higher speed by a motor 6 for removing water from the washed clothes.

As shown in FIG. 2, each of the vibration damper assemblies 5 comprises a cylinder 11 and a piston rod 14 inserted in the cylinder 11 through an oil seal 12 and a rod guide 13 that are disposed on one end of the cylinder 11. The piston rod 14 supports on its end inside the cylinder 11 a piston 15 fixed to the piston rod 14 and slidably held against the inner peripheral surface of the cylinder 11. The piston 15 divides the interior space of the cylinder 11 into oil chambers S1, S2.

As shown in FIG. 4, the piston 15 has an oil passage 16 defined therein for generating damping forces when the vibration damper assembly 5 is extended. A flow control valve 17 is disposed on the piston rod 14 on one side of the oil passage 16, the flow control valve 17 having an oil passage 17a for communication with the oil passage 16. The flow control valve 17 is normally urged toward the piston 16 by a spring 20 held in a spring holder 19 that is positioned by a retainer 18 fixed to the piston rod 14. A disc check valve 17b is disposed on the piston side of the flow control valve 17, the disc check valve 17b being openable to provide communication between the oil passages 16, 17a when the vibration damper assembly 5 is extended.

A partition member 21 is fixedly disposed in the cylinder 11 between the other end thereof and the piston 15. The partition member 21 defines an oil chamber S3 separated from the oil chamber S2. A central stop plug 22 is fitted in the partition member 21 and is generally positioned on the piston side of the partition member 21. The partition member 21 has an oil passage 23 defined therein for generating damping forces when the vibration damper assembly 5 is compressed. A flow control valve 24 is disposed on the stop plug 22 on one side of the partition member 21 and has an oil passage 24a for communication with the oil passage 23. The flow control valve 24 is normally urged toward the partition member 21 by a spring 26 held in a spring holder 25 that is to the piston rod 14. A disc check valve 24b is disposed on the partition member side of the flow control valve 24, the disc check valve 24b being openable to provide communication between the oil passages 23, 24a when the vibration damper assembly 5 is compressed.

The piston 15 and the partition member 21 operate in the cylinder 11 as follows:

FIG. 4 shows the position of the piston 15 and the partition member 21 when the vibration damper assembly 5 is extended. When the piston rod 14 moves in a direction out of the cylinder 11, the flow control valve 17 is forced toward the piston 15 by the oil, and the disc check valve 17b is opened, allowing communication between the oil passages 16, 17a. The oil now flows from the oil chamber S1 through the oil passages 17a, 16 into the oil chamber S2, producing damping forces as it flows through the oil passage 17a. Since the oil passage 17a has a small cross-sectional area, the oil flow through the oil passage 17a is not large enough to compensate for an increase in the volume of the oil chamber S2 that is caused by the movement of the piston rod 14, thereby developing a negative pressure in the chamber S2. Therefore, the flow control valve 24 on the stop plug 22 is moved toward the oil chamber S2, allowing the oil to flow from the oil chamber S3 through the oil passage 23 and between the flow control valve 24 and the cylinder 11 into the oil chamber S2.

When the vibration damper assembly 5 is compressed, the flow control valve 17 is moved away from the piston 15 against the bias of the spring 20, allowing the oil to flow from the oil chamber S2 through the oil passage 16 and between the flow control valve 17 and the cylinder 11 into the oil chamber S1. As the volume of the piston rod 14 that enters the cylinder 11 is large, the oil pressure in the oil chamber S2 is greatly increased. The pressure buildup in the oil chamber S2 forces the disc check valve 24b to open, allowing the oil to flow from the oil chamber S2 through the oil passages 24a, 23 into the oil chamber S3. At this time, the oil passage 24a generates damping forces as the oil flows therethrough.

An attachment 30 is mounted on the other end of the cylinder 11 for attaching the vibration damper assembly 5 to the washing container 2. The piston rod 14 has an outer end portion 14a inserted in a bore 29 defined in an attachment 31 for attaching the vibration damper assembly 5 to the washing machine frame 3. The attachment 31 is slidably mounted on the piston rod 14 through bushings 27, 28, but can be locked to the piston rod 14. The piston rod end portion 14a has a distal end within the attachment 31, with a stopper ring 32 fixed to the distal end. The piston rod end portion 14a has an annular groove 33 defined in its outer circumferential surface at a distance spaced from the stopper ring 32. The attachment 31 has a solenoid support base 34 on one side thereof which supports a solenoid 35 that is controlled by a control unit 50. A plunger 36 extends from the solenoid 35 toward the piston rod end portion 14a, and a stopper shaft 37 for engaging in the groove 33 of the piston rod end portion 14a is secured to the distal end of the plunger 36 by a set screw 40. When the solenoid 35 is de-energized or energized, the plunger 36 is axially moved to project or retract the stopper shaft 37 into or out of engagement in the annular groove 33, thereby locking the piston rod 14 to or unlocking the piston rod 14 from the attachment 31.

The control unit 50 detects the rotational speed of the rotatable drum 9 or the motor 6 to detect the magnitude of vibration of the drum 9. Until the detected rotational speed reaches a predetermined normal high speed N, the control unit 50 keeps the solenoid 35 de-energized, permitting a spring 38 to move the plunger 36 in a direction to project the stopper shaft 37. Therefore, while the detected rotational speed is lower than the predetermined high normal speed N, the piston rod 14 is locked with respect to the attachment 31. When the detected rotational speed reaches the predetermined normal high speed N, control unit 50 energizes the solenoid 35 to move the plunger 36 to retract the stopper shaft 37. Therefore, insofar as the detected rotational speed is higher than the predetermined normal high speed N, the piston rod 14 is unlocked from the attachment 31.

As shown in FIG. 5, the control unit 50 comprises a rotary encoder 43 mounted on the rotatable shaft of the motor 6 for detecting the rotational speed of the motor 6, a vibration determining circuit 44 for comparing a signal indicating the detected rotational speed from the rotary encoder 43 with a reference signal and issuing a vibration damping signal when the rotational speed of the motor 6 is higher than a predetermined speed N, and a solenoid driver 45 for energizing the solenoid 35 to retract the stopper shaft 37 in response to the vibration damping signal from the vibration determining circuit 44.

Instead of detecting the rotational speed of the drum 9, centrifugal forces applied to the drum 9 may be detected by a load sensor (or a G sensor) to determine the magnitude of vibration of the drum 9, or the magnitude or number of strokes of the vibration damper assembly 5 may be detected to determine the magnitude of vibration of the drum 9.

Operation of the vibration damper assembly 5 will now be described below.

The motor 6 is energized to start rotating the drum 9 in the washing container 2 for removing water from the washed clothes therein. Initially, the washed clothes stays localized in the lower portion of the horizontal cylindrical washing container 2, causing the drum 9 to vibrate under large centrifugal forces.

Since the rotational speed of the motor 6 is relatively low during this initial stage, the plunger 36 is urged by the spring 38 to project the stopper shaft 37 into engagement in the annular groove 33 of the piston rod end portion 14a, keeping the piston rod 14 locked with respect to the attachment 31. Therefore, the vibration damper assembly 5 is connected between the washing container 2 and the frame 3, and damping forces are generated by the flow control valves 17, 24 as described above. As the rotational speed of the drum 9 increases, the rotation thereof is stabilized, and the clothes start being distributed evenly in the drum 9, so that the vibration of the washing container 2 is gradually reduced.

When the rotational speed of the motor 6 reaches the predetermined speed N, the control unit 50 energizes the solenoid 35 to retract the plunger 36 against the bias of the spring 38. The stopper shaft 37 is also retracted out of engagement in the annular groove 33, unlocking the piston rod 14 from the attachment 31. The piston rod 14 is now freely slidable in the attachment 31 through the bushings 27, 28. Therefore, the vibration damper assembly 5 is disconnected from the frame 3. The piston rod 14 is subjected to only the small frictional resistance from the bushings 27, 28. As no damping forces are generated by the vibration damper assembly 5, the vibration of the washing container 2 is no longer transmitted to the frame 3.

Figure 3:
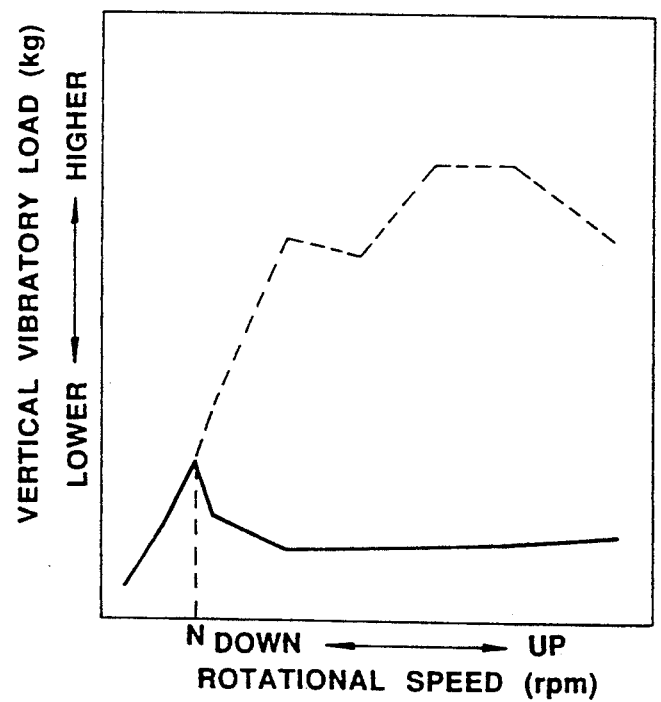
FIG. 3 is a diagram showing the relationship between the rotational speed of the washing drum of the washing machine and the load on the legs of the washing machine.

As can be seen from the solid-line curve shown in FIG. 3, before the rotational speed of the motor 9 reaches the predetermined speed N, the vertical vibratory load applied from the washing container 2 to the frame 3 progressively increases from a low level. When the rotational speed of the motor 9 reaches and increases above the predetermined speed N, since the vibration damper assembly 5 is disconnected from the frame 3, the vertical vibratory load applied from the washing container 2 to the frame 3 drops to and is maintained at a much lower level than would be if the vibration damper assembly remained connected to the frame 3 as indicated by the broken-line curve shown in FIG. 3. It can be understood from FIG. 3 that substantially no vibration is transmitted from the washing container 2 to the frame 3 when the rotational speed of the motor 9 reaches and becomes higher than the predetermined speed N.

When the rotation of the drum 9 is stopped, the control unit 50 detects the stopped condition, and de-energizes solenoid 35. The plunger 36 is urged by the spring 38 to project the stopper shaft 37 into engagement with the outer circumferential surface of the piston rod end portion 14a or in the annular groove 33 thereof, depending on the axial position in which the piston rod 14 is stopped. If the stopper shaft 37 is held against the outer circumferential surface of the piston rod end portion 14a, then when the drum 9 starts rotating again, the piston rod end portion 14a is displaced with respect to the attachment 31, allowing the stopper shaft 37 to slide off the outer circumferential surface of the piston rod end portion 14a into the annular groove 33. The piston rod 14 and the attachment 31 are thus locked again with respect to each other.

In the illustrated embodiment, the piston rod 14 is selectively locked with respect to the frame 3 by a locking mechanism on the piston rod 14. However, the cylinder 11 may be selectively locked with respect to the washing container 2 by a similar locking mechanism mounted on the cylinder 11.

The vibration damper assembly 5 may be incorporated in not only washing machines, but also spinning dewatering machines, spinning driers, or the like.

The vibration damper assembly 5 may be of the friction type rather than of the hydraulic type.

In the illustrated embodiment, the frame 3 of the washing machine 1 and the piston rod 14 are disconnectably connected to each other by the attachment 31. However, the piston rod 14 may be directly connected to the frame 3 with a locking mechanism disposed therebetween for selectively locking and unlocking the piston rod 14 and the frame 3.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

We claim:

1. A damper assembly for use between a frame and a container suspended in the frame and housing a rotatable drum as a source of vibration, said damper assembly comprising:

a cylinder adapted to be supported by either one of the frame and the container, said cylinder being filled with working oil;

a piston slidably disposed in said cylinder;

damping force generating means on said piston, for generating damping forces against vibration transmitted from the container;

a piston rod having an end coupled to said piston and an opposite end extending out of said cylinder and supported by the other of the frame and the container;

vibration transmission cutoff means activatable for disabling said damping force generating means to substantially cut off the transmission of vibration between the container and the frame;

detecting means for detecting the magnitude of the vibration of the container; and selective actuator means connected to said detecting means, for selectively activating and inactivating said vibration transmission cutoff means depending on the detected magnitude of the vibration of the container.

2. A damper assembly according to claim 1, wherein said selective actuator means comprises means for activating said vibration transmission cutoff means when the magnitude of the vibration of the container is smaller than a predetermined value.

3. A damper assembly according to claim 1, wherein said detecting means comprises means for detecting the rotational speed of the rotatable drum.

4. A damper assembly according to claim 3, wherein said selective actuator means comprises means for activating said vibration transmission cutoff means when the detected rotational speed of the rotatable drum is equal to or higher than a predetermined value.

5. A damper assembly according to claim 1, wherein said vibration transmission cutoff means comprises support means adapted to be coupled between a first member, which is either one of the container and the frame, and a second member, which is either one of one end of said cylinder and said opposite end of said piston rod, for supporting said first and second members for relative movement with respect to each other, and locking means for unlockably locking the first and second members with respect to each other.

6. A damper assembly according to claim 5, wherein said selective actuator means comprises means for actuating said locking means to unlock the first and second members from each other thereby activating said vibration transmission cutoff means.

7. A damper assembly according to claim 5, wherein said support means comprises a bore defined in one of the first and second members, and a rod member mounted on the other of the first and second members and slidably inserted in said bore.

8. A damper assembly according to claim 7, wherein said locking means comprises a groove defined in an outer circumferential surface of said rod member, and a stopper supported on one of the first and second members and movable into said bore for engagement in said groove.

9. A damper assembly according to claim 8, wherein said selective actuator means comprises a solenoid having a plunger coupled to said stopper.

10. A damper assembly for use between a frame and a container suspended in the frame and housing a rotatable drum as a source of vibration, said damper assembly comprising:
   a damper having a cylinder filled with working oil, a piston slidably disposed in said cylinder, and a piston rod having an end coupled to said piston and an opposite end extending out of said cylinder;
   first support means for said cylinder;
   second support means for said piston rod;
   said first and second support means each being a different one of said frame and said container;
   detecting means for detecting the magnitude of vibration of the container; and
   unlocking means connected to said detecting means, for unlocking said either one of the cylinder and the piston rod and said either one of the frame and the container from each other when the detected magnitude of the vibration of the container is smaller than a predetermined value.

11. A damper assembly according to claim 10, wherein said detecting means comprises means for detecting the rotational speed of the rotatable drum.

12. A damper assembly according to claim 11, wherein said unlocking means comprises means for unlocking said either one of the cylinder and the piston rod and said either one of the frame and the container from each other when the detected rotational speed of the rotatable drum is equal to or higher than a predetermined value.

* * * * *